(12) United States Patent
Maheshwari

(10) Patent No.: US 9,036,227 B2
(45) Date of Patent: May 19, 2015

(54) METHOD AND APPARATUS FOR GENERATING WHITE UNDERBASE AND GENERATING SUITABLY MODIFIED SEPARATIONS FOR PRINTING ON COLORED BACKGROUND OTHER THAN WHITE

(76) Inventor: Sanjay Chandermohan Maheshwari, Gujarat (IN)

( * ) Notice: Subject to any disclaimer, the term of this patent is extended or adjusted under 35 U.S.C. 154(b) by 1452 days.

(21) Appl. No.: 11/919,305

(22) PCT Filed: Feb. 19, 2007

(86) PCT No.: PCT/IN2007/000067
§ 371 (c)(1),
(2), (4) Date: Oct. 21, 2009

(87) PCT Pub. No.: WO2007/099554
PCT Pub. Date: Sep. 7, 2007

(65) Prior Publication Data
US 2010/0177327 A1    Jul. 15, 2010

(51) Int. Cl.
G03F 3/08 (2006.01)
H04N 1/60 (2006.01)
H04N 1/54 (2006.01)
B41J 3/407 (2006.01)
G06K 15/02 (2006.01)
B41J 2/21 (2006.01)
C09D 11/54 (2014.01)

(52) U.S. Cl.
CPC ............... *H04N 1/54* (2013.01); *B41J 3/4078* (2013.01); *G06K 15/02* (2013.01); *G06K 15/021* (2013.01); *B41J 2/2114* (2013.01); *B41J 2/2117* (2013.01); *C09D 11/54* (2013.01)

(58) Field of Classification Search
CPC combination set(s) only.
See application file for complete search history.

(56) References Cited

U.S. PATENT DOCUMENTS

| | | | |
|---|---|---|---|
| 6,262,808 B1 | 7/2001 | Hermann | |
| 6,425,324 B1 | 7/2002 | Yamamoto | |
| 6,428,143 B2* | 8/2002 | Irihara et al. | 347/43 |
| 6,738,071 B2* | 5/2004 | Barmettler | 345/611 |
| 6,887,640 B2* | 5/2005 | Zhang et al. | 430/124.4 |
| 2004/0021847 A1* | 2/2004 | Yoshizawa | 355/77 |
| 2004/0027416 A1* | 2/2004 | Rosenberger et al. | 347/43 |
| 2004/0252173 A1* | 12/2004 | Ben-Zur et al. | 347/101 |
| 2006/0162586 A1* | 7/2006 | Fresener et al. | 101/115 |
| 2007/0067928 A1* | 3/2007 | Ellis | 8/445 |
| 2007/0188535 A1* | 8/2007 | Elwakil et al. | 347/15 |
| 2013/0215440 A1* | 8/2013 | Chandermohan | 358/1.9 |

* cited by examiner

Primary Examiner — Richard Zhu
(74) Attorney, Agent, or Firm — The Webb Law Firm

(57) ABSTRACT

The invention relates to an embedded system and a method to generate a white underbase for printing on a colored background from the given image to be printed automatically without any human intervention or operator's assistance. This invention simplifies the process of printing on colored substrates like garments, packing materials, woods, acrylic sheets, cardboard etc. Along with the simplification of a great amount of productivity increase is achieved in comparison to the existing methods as it eliminates any human intervention.

11 Claims, 3 Drawing Sheets

Figure 1:
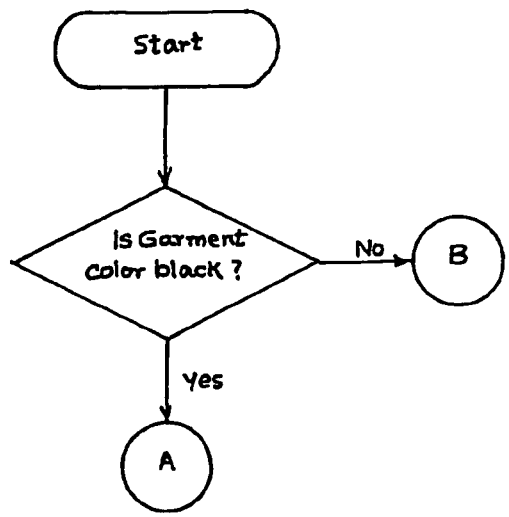

METHOD AND APPARATUS FOR GENERATING WHITE UNDERBASE AND GENERATING SUITABLY MODIFIED SEPARATIONS FOR PRINTING ON COLORED BACKGROUND OTHER THAN WHITE

BACKGROUND OF THE INVENTION

1. Field of the Invention

The present invention generally relates to an apparatus to generate a white underbase for printing of a given image on a colored background. More particularly, the present invention relates to an apparatus for generating white underbase to enable automatic printing of a given image on a colored background. The invention further relates to a method for generating white underbase to enable automatic printing of given images on colored substrate.

2. Description of Related Art

In general, printing is done on white substrate using process colors viz. CMYK with or without extended inks/spot inks like orange, blue, green, red etc. There are some applications where only the spot colors from the image are used. However, in the majority of the circumstances the printing plates are produced with white background in mind.

Still, there are certain applications where printing is required to be done on colored backgrounds including black. For such situations, a white underbase is used. Currently the methods deployed in the industry to meet the needs of such situations are inadequate and cumbersome, and are dependent upon the skill level of the operator producing the separations including the white underbase for making the plates for a printing process. Presently, almost all the separation work is done on computers and similar electronic devices. Hence these separations are used directly by the printing device without generating a plate for printing. Such a printing device could be a laser printer or an inkjet printer etc.

There are four widely used existing methods to generate the white underbase. They are as under:

1. The most common method used when printing over the black background comprises use of the black color of the background to replace the use of black ink in the process color printing. The white underbase so developed is a grayscale image having tints varying in accordance with the image to be printed. Currently the most common method used in the industry is to produce a negative of the image to be reproduced, convert it into gray image and then adjust the gray levels of the resulting image with the help of the operator. The amount of white to be present is actually decided on the basis of the wisdom of the operator. If the operator is experienced enough then a good starting point can be achieved that can be perfected in one or two further iteration. Otherwise it takes additional iterations of generating the white underbase including printing over the underbase before the right underbase setting can be achieved.

More often than not, the operator ends up defining much of the area as solid white resulting in white more than necessary, thus resulting in inferior prints. Further, such a method involves an inherent weakness in the assumption that the grayscale negative of the image to be printed will define the white underbase properly. This assumption fails in almost all cases except when the image itself is a grayscale image or where image colors are light shades. This method for example, fails in case of dark and saturated colors except for few hues of yellow color. This method fails in case of the bright red or a bright blue colors as such colors will result in a dark gray value and hence very little amount of white ink will be used as the underbase. But printing of such colors indeed needs almost 100% white underbase as they do not contain any black component. Reference [1], [2] and [4].

2. The second method used by the industry is to put solid white underbase every where wherever any color in the image is to be printed. This method is generally used in case of colored background, though the same can be used for black background as well. The printing is then done normally on the white underbase.

This method fails if the image to be printed is having soft edges or vignettes for smooth blending with the background. The reason is that a solid white is printed as an underbase and the printing of the image is done over it assuming as if it is being printed now on the white background. The edges of the image where soft blending with the background should otherwise be there, become hard because of a sudden jump from the background color to the white color. Reference [1], [2], [3], [4], [5].

3. In one method described in reference [4], it requires the use of two different production of the same image, namely on the black background and on the white background to be fed to the system to be able to create a white underbase with the help of the operator interaction.

4. There is another method disclosed in the reference [6], where the operator generates the white underbase interactively prior to printing of an image by selecting the color that is to be considered as the background with an option to soften the edges of the white underbase so generated.

In all of the above prior art, the white underbase is generated by the operator, either interactively while giving the job for printing or is done offline in any image editing software and saved as a channel data for the white underbase [5] along with the image to be used for printing.

SUMMARY OF THE INVENTION

It is therefore an object of the invention to propose an apparatus for generating white underbase to enable automatic printing of a given image on a colored background which eliminates the disadvantages of the prior art.

Another object of the invention is to propose an apparatus for generating white underbase to enable automatic printing of a given image on a colored background which eliminates human intervention to obviate human errors.

Yet another object of the invention is to propose an apparatus for generating white underbase to enable automatic printing of a given image on a colored background which facilitates simplification of the process of printing on colored substrates.

A further object of the invention is to propose an apparatus for generating white underbase to enable automatic printing of a given image on a colored background which increases the productivity.

A still further object of the invention is to propose a method for generating white underbase to enable automatic printing of given images on colored substrate.

Accordingly, there is provided an embedded system for online or offline printing on colored background based on automatic generation of white underbase including production of modified separations. The system comprises an embedded apparatus for receiving input data respecting an image printable on the colored background, the image being either color or grayscale containing transparency information. The apparatus processes the input data and outputs white underbase information including modified separation. A dual-acting device is provided which is capable of acting in a first aspect as a plate making or film generating means in respect of offline printing, and in a second aspect acting as a print controller in respect of online printing. And a printing device is arranged which could be selected from a group consisting of offset printing device and screen printing device when offline printing being adapted, and/or, selected from a group comprising inkjet printer and laser printer when online printing being resorted.

The invention further provides a method of generating white underbase information from a given image to enable printing on garments having black background. The method comprises the steps of: identifying the pixels applicable or discardable for generating white base by adapting the transparency or opacity data encoded in the given image; computing the color corresponding to the opacity data to be adapted for primaries/color generation; splitting image color into printing color percentages, the printing color percentages being variable in amount, type and number corresponding to different types of printers like CMYK, CMYKOB, CMYKOG where K corresponds to black color; and generating white underbase by using black printing color data earlier extracted.

The invention also provides a method of generating white underbase information from a given image to enable printing on colored garments having colored background other than black. The method comprises the steps of: identifying the pixels applicable or discardable for generating white base by adapting the transparency or opacity data encoded in the given image; computing the amount of white underbase to be printed; determining the white underbase value by using transparency/opacity data encoded in the given image; and computing the color to be considered for printer primaries generation for printing on the white underbase adapting the opacity and the original color data.

The invention thus generates the white underbase for printing on the colored substrate including black. Since black is a very generic color which is used both in process color printing as well as printing with spot colors, the black background is treated as a very special case because the black background can be used to eliminate the need of printing black color.

BRIEF DESCRIPTION OF THE ACCOMPANYING DRAWINGS

FIG. 1—shows a flow-chart for categorization of the garments.

Figure 2:
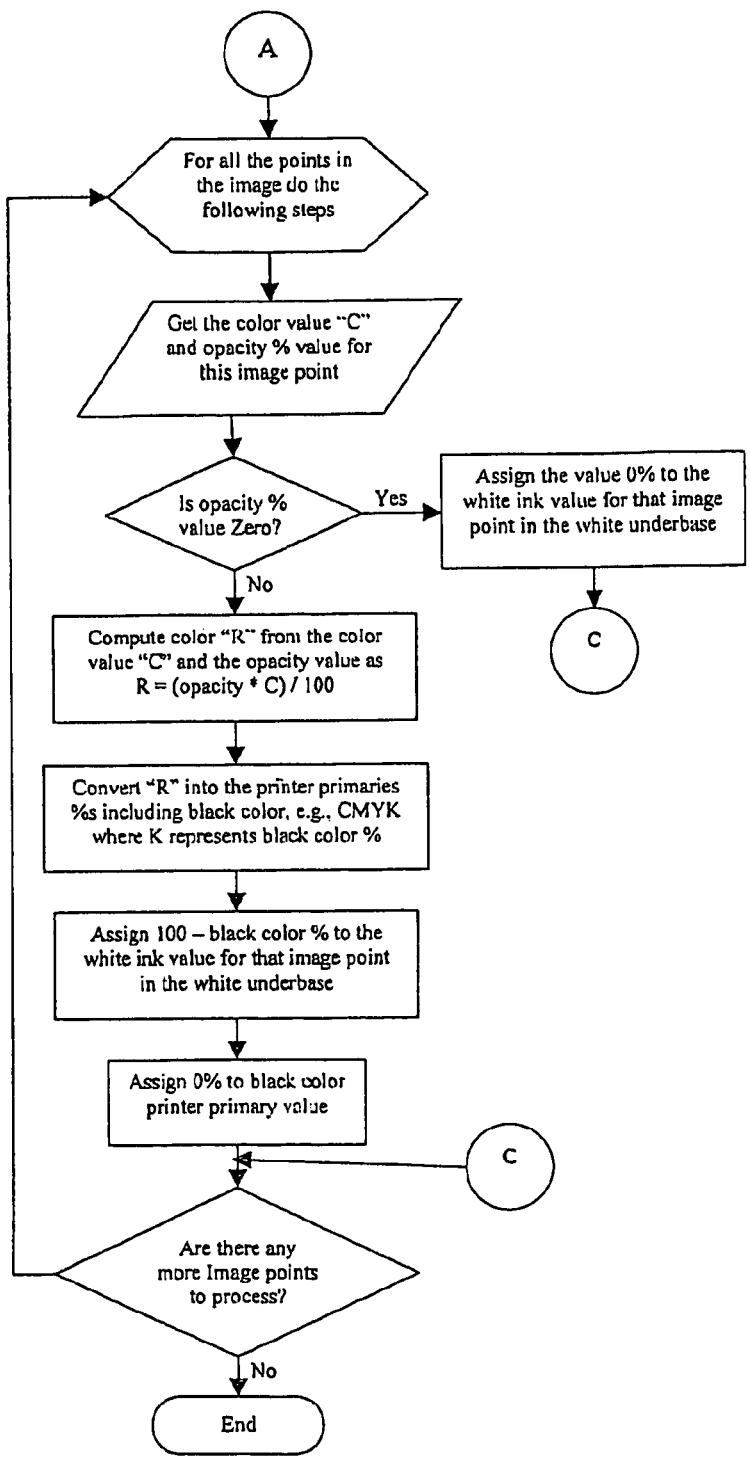

FIG. 2—shows a flow-chart for generating a white underbase for black garments

Figure 3:
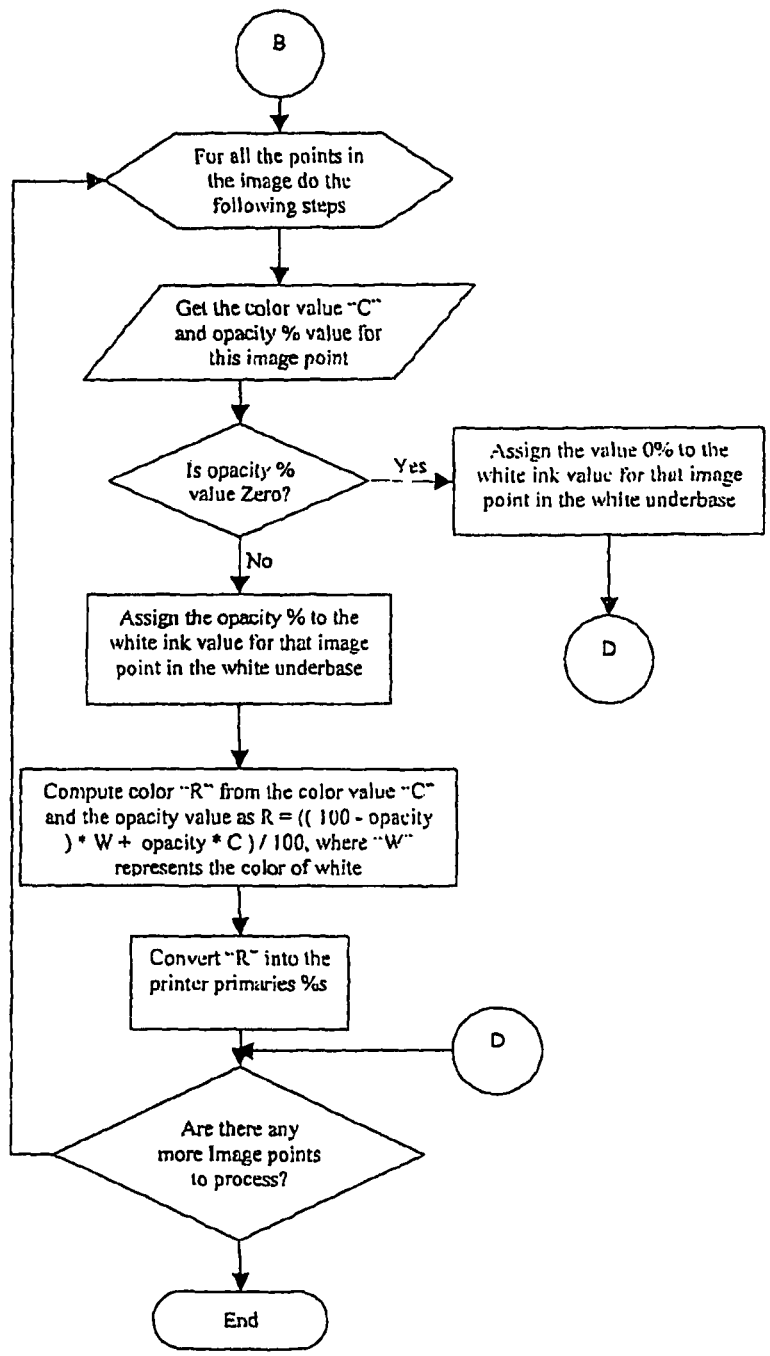

FIG. 3—shows a flow-chart for generating a white underbase for colored garments, other than black.

Figure 4:
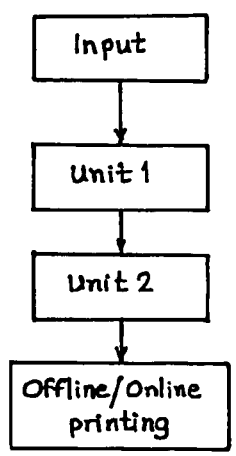

FIG. 4—shows schematically the apparatus including an embedded system according to the invention.

DETAILED DESCRIPTION OF THE INVENTION

As shown in FIG. 4, the system comprises:

a. Input representing the image that is to be printed on the colored background. This image can be color or grayscale. The image can be vector or bitmap in nature. The image may also contain transparency information.

[Definition 1—Transparency] The transparency information is the information that indicates how opaque the image is at a particular location. Such information is embedded by known image editing softwares as a part of the image. For example, such information is embedded by the software Adobe photoshop from Adobe corporation with the color data as "layer". This transparency information is generally generated by the designer of the image as a part of his artwork design, so no special effort is required here. The transparency information can also be encoded with the image data in other ways for example as a special color which is not the part of the image data. Such encoding is permitted by file formats like PNG or GIF [7]. Some graphic image file formats also refer to this information as "alpha" data which can be interpreted same as transparency. Example of such a file format is TGA [7]. The purpose of highlighting different ways of encoding the transparency information with the image data is to illustrate different means of encoding the transparency information along with the image data. The name of the file formats mentioned here are only for the purpose of illustration and by no means excludes those that are not mentioned here but contains transparency information as described herein. Any image that does not contain the transparency information explicitly as per this definition is assumed to be fully Non-Transparent or Opaque.

Another term that is used very often in the art in place of transparency is opacity. In fact Opacity and Transparency are complementary of each other and are related by a simple equation of, Transparency %=100%−Opacity %. Hence throughout this disclosure the transparency and opacity are the words used as deemed appropriate to illustrate and are related to each other by the preceding equation. Also Opacity is expressed in % on a scale 0 to 100%, where 0 represents full transparency and 100 represents full opacity and the values between 0 and 100 representing the intermediate states.

b. The white underbase is generated in unit-1, which is an embedded device capable of automatically generating data in respect of white underbase information based on the input (a).

c. Unit 2 is a plate making device or film generating device if the printing is to be done offline. If the printing is to be done online then this device acts as the print controller that receives the instruction on the basis of the white underbase data generated by unit 1. This reception of information can be instant for an online printing device as it is being generated by unit 1 or can be stored and transmitted later to it.

d. Offline printing devices such as offset printing or screen printing machines etc. Online printing devices include devices like inkjet printer, laser printer etc.

[Definition 2—Online device] For the purpose of this invention, an online printing device is the device that can make utilization of the white underbase information generated by unit 1 directly without needing any physical intermediate like plate or screen or film etc. prior to laying out of the white underbase information.

[Definition 3—Offline device] For the purpose of this invention, an offline printing device is the device that can make utilization of the white underbase information generated by unit 1 only with the help of a physical intermediate like plate or screen or film etc. prior to laying out of the white underbase information.

Description and Explanation of Unit 1.

The invented system processes the colored garments in two separate methods depending on the background of the garments, for example, 1. Garment with Black background.
2. Garment with colored background other than black.

For both above two cases the printable area is defined as where opacity of the image is not defined as zero.

Embodiment 1

Garments with Black Background

This method is used if in the printing process one of the color that is used is black. If there is no black color then it is treated as any other colored background like in case 2.

In this case, the color of the background is used to replace the black printer primary. The printer may or may not contain this ink physically when the color of the background is black as the background color along with white ink is used to replace it. For example, a CMY printer having white ink on a black background is equivalent to a CMYK printer. So for the purpose of the invention the black background when used with white ink acts as the printer black primary.

The basic concept is to determine how much black color is present in the image color and then replace it with equivalent tint of black resulting from the combination of black background and white underbase.

In order to generate the white underbase, following steps are carried-out for all of the printable area in the image.
Step 1—Determining if the opacity of the image at the point to be printed is zero. If yes then incorporating Zero % in the white underbase data for that location. Alternatively, following rest of the steps.
Step 2—Computing the color "R" from the color value "C" at the point to be printed in accordance with the opacity information as established by the equation, R=Opacity*C/100.
Step 3—Splitting the color "R" into printing color percentages including black color %, e.g., CMYK printing colors where K represents black printing color. Subtracting the amount of black printing color from 100% and assign it to white underbase data for that point.
Step 4—Assigning 0% to black printing color data, if physical black ink channel is also present.

Within the printable area the color values at each location are splitted into the percentage coverage of the printing colors that include black.
Where
1. '*' indicates multiplication sign and '/' represents division and '=' represent assignment.
2. Opacity is expressed in %.

Embodiment 2

Garments with Colored Background

In order to generate the white underbase, following steps are carried-out for all of the printable area in the image.
Step 1—Determining if the opacity of the image at the point to be printed is zero. If yes then incorporating Zero % in the white underbase data for that location. Alternatively, following rest of the steps.
Step 2—Assigning the percentage opacity to white underbase data for that location.
Step 3—Using the opacity information, composing the color "C" of the image with White color "W" using the following equation, Result "R"=(((100−Opacity))*W+Opacity*C)/100.
Step 4—Using the resulting color "R" for generating the printing color percentages.
Where
1. '*' indicates multiplication sign and '/' represents division and '=' represent assignment.
2. Opacity is expressed in %.
The method to convert the color value into corresponding printing colors/primaries data is known. A wide amount of literature is available on this subject. Further how those generated value of printing color primaries including white underbase are treated after going through the steps of the invention is left to the implementer of unit 2. See references [8] [9].

PREFERRED EMBODIMENTS

Consider an Image consisting of millions of image points/pixels. Each image point or pixel could be having different colors leading potentially millions of colors. So in order to illustrate the invention, as an example a few colors, may be considered. Further the images can be represented as RGB or CMYK or LAB or other color spaces capable of defining the image colors. RGB space defined by tuple (Red, Green, Blue) is selected for illustration of the present invention. The discussion however can be extended to other color spaces in much similar way.

The printer primaries is assumed to be CMYK where K represents black color, but can be extended to other printer types in accordance with the teachings of this invention. Also different CMYK printers may have different CMYK primaries leading to different CMYK output for the same input color. Despite this, teachings of the invention are applicable to each of these output situations.

Embodiment 1

Black Background

Example 1

Considering Red Color Defined as
"C"(R,G,B)=(255,0,0) and Opacity 100%

Carrying out the steps of embodiment 1, as described earlier, the following outcome is observed:
Step 1—non zero opacity, the color "C" for white underbase generation is considered.
Step 2—Computing color "R" from "C" and opacity as R=(100*(255,0,0))/100 to get "R"=(255,0,0).
Step 3—Computing the printer primaries C,M,Y,K. "R" results in (0,99,100,0) for the set of CMYK printer primaries. So the corresponding value of black printer primary or "K" is 0. Hence 100−0% is assigned to the White underbase value for this color.
Step 4—0% is assigned to the value of "K".

Example 2

Considering Red Color Defined as
"C"(R,G,B)=(255,0,0) and Opacity 0%

Carrying-out the steps of embodiment 1, the following outcome is observed:
Step 1—zero opacity, so assigning the value of 0% to white underbase at that point.

Example 3

Considering Red Color Defined as
"C"(R,G,B)=(255,0,0) and Opacity 50%

Carrying-out the steps of embodiment 1, the following outcome is observed:
Step 1—non zero opacity, the color "C" for white underbase generation is considered.

Step 2—Computing color "R" from "C" and opacity as R=(50*(255,0,0))/100 to get "R"=(127.5,0,0).
Step 3—Computing the printer primaries C,M,Y,K. "R" results in (29,100,100,38) for our set of CMYK printer primaries. So the corresponding value of black printer primary or "K" is 38. Hence 100–38%, i.e., 62% is assigned to the White underbase value for this color.
Step 4—0% is assigned to the value of "K".

Example 4

Considering Dark Green Color Defined as
"C"(R,G,B)=(0,104,34) and Opacity 100%

Carrying-out the steps of embodiment 1, the following outcome is observed:
Step 1—non zero opacity, the color "C" for white underbase generation is considered.
Step 2—Computing color "R" from "C" and opacity as R=(100*(0,104,34))/100 to get "R"=(0,104,34).
Step 3—Computing the printer primaries C,M,Y,K. "R" results in (89,33,100,26) for the set of CMYK printer primaries. So the corresponding value of black printer primary or "K" is 26. Hence 100–26%, i.e., 74% is assigned to the White underbase value for this color.
Step 4—0% is assigned to the value of "K".

Embodiment 2

Colored Background Other than Black

In case of RGB images the white color "W" is represented by RGB (255,255,255).

Example 1

Considering Red Color Defined as
"C"(R,G,B)=(255,0,0) and Opacity 100%

Carrying-out the steps of embodiment 2, the following outcome is observed.
Step 1—non zero opacity, the color "C" for white underbase generation is considered.
Step 2—the value of 100% is assigned to the white underbase value for this color as opacity is 100%.
Step 3—Computing color "R" from "C" and opacity as R=((100−100)*(255,255,255)+100*(255,0,0))/100 to get "R"=(255,0,0).
Step 4—Computing the printer primaries C,M,Y,K. "R" results in (0,99,100,0) for the set of CMYK printer primaries.

Example 2

Considering Red Color Defined as
"C"(R,G,B)=(255,0,0) and Opacity 0%

Carrying-out the steps of embodiment 2, the following outcome is observed:
Step 1—zero opacity, so assigning the value of 0% to white underbase at that point.

Example 3

Considering Red Color Defined as
"C"(R,G,B)=(255,0,0) and Opacity 50%

Carrying-out the steps of embodiment 2, the following outcome is observed:
Step 1—non zero opacity, the color "C" for white underbase generation is considered.
Step 2—Assigning the value of 50% to the white underbase value for this color as opacity is 50%.
Step 3—Computing color "R" from "C" and opacity as R=((100−50)*(255,255,255)+50*(255,0,0))/100 to get "R"=(255,127.5,127.5).
Step 4—Computing the printer primaries C,M,Y,K. "R" results in (0,64,39,0) for the set of CMYK printer primaries.

Example 4

Considering Dark Green Color Defined as
"C"(R,G,B)=(0,104,34) and Opacity 100%

Carrying-out the steps of embodiment 2, the following outcome is observed:
Step 1—non zero opacity, so the color "C" for white underbase generation is considered.
Step 2—Assigning the value of 100% to the white underbase value for this color as opacity is 100%.
Step 3—Computing color "R" from "C" and opacity as R=((100−100)*(255,255,255)+100*(0,104,34))/100 to get "R"=(0,104,34).
Step 4—Computing the printer primaries C,M,Y,K. "R" results in (89,33,100,26) for the set of CMYK printer primaries.

IMPLEMENTATION

The invented apparatus can be implemented as an embedded system inside any printing device with a device having a microprocessor or with computing ability or using a computing device or a PDA. The preferred method of implementation is a computer system that can be interfaced with the devices mentioned as a part of unit 2 or work in isolation and interfaced with unit 2 by means of data storage or transmitting devices.

CITED REFERENCES 1. www.screenprinters.net/articles/index.php?art=14
2. www.images-magazine.com/imagesarticle.php/article_id=47
3. www.signweb.com/digital/cont/rolandsoljetsc.html.
4. Fast Artist SignLab7.1 from U.S. Screen Print & Inkjet Technology, a firm based in Arizona USA. Chapter 5—"Printing white ink on garments"
5. Onyx RIP White paper—Working with white ink, onyx version 6.5. May 2005 from Onyx Graphics Corporation.
6. Onyx RIP White paper Specialty ink tools, onyx version 6.5. October 2005 from Onyx Graphics Corporation.
7. Encyclopedia of Graphics file formats (Second Edition)—Book by James D. Murray and William VanRyper, published by O'Reilly & Associates Inc.
8. Color Technology for Electronic Imaging Devices—Book by Henry R. Kang, published by SPIE Press. ISBN 0-8194-2108-1
9. ICC file format for color profiles—International color consortium website www.color.org.

I claim:
1. An embedded system for online or offline printing on a colored background based on an automatic generation of a white underbase including production of modified separations, the system comprising:
an embedded apparatus for receiving input data relating to an image printable on the colored background, wherein the image is one of color and grayscale containing opacity information, wherein the apparatus is configured to process the input data and output white underbase information based on the opacity information and modified color separations based on a modified color (R) that will be printed over the white underbase, wherein R=((100−opacity)*the color of white+opacity*the desired color)/100, when the colored background is a color other than black and R=(opacity*the desired color)/100, when the colored background is black;

a dual-acting device configured to act in a first aspect as a plate making or film generating means in offline printing, and in a second aspect acting as a print controller in online printing; and a printing device comprising:
- an offset printing device or a screen printing device when offline printing is used; or
- an inkjet printer and a laser printer when online printing is used.

2. A method of generating white underbase information from a given image to enable printing on a substrate having a black background, comprising the steps of:
a) determining the color value (C) and opacity value for each image point;
b) for each image point, if the opacity value is zero, assigning a value of zero for the white underbase, otherwise,
c) for each image point, computing a modified color (R) to be configured for printing color/primaries generation using the opacity data and the color value (C) determined in step a), wherein R=(opacity*C)/100;
d) for each image point, splitting the modified color (R) into printing primary color percentages that include a percentage of black printing primary color;
e) for each image point, generating a white underbase, wherein the percentage of white underbase is based on 100 minus the percentage of black printing primary color extracted in step d); and
f) for each image point, assigning 0% to the black printing primary color determined in step d).

3. The method of claim 2, wherein the printing colors/primaries are variable based on the type of printer being used.

4. The method of claim 3, wherein the printer includes black as the printing color/primary.

5. The method of claim 3, wherein the black printing primary color data is configured to create a white underbase on a substrate having a black background.

6. A method of generating white underbase information from a given image to enable printing on a colored substrate having a colored background other than black, comprising the steps of:

a) determining the color value (C) and opacity value for each image point;
b) for each image point, if the opacity value is zero, assigning a value of zero for the percentage of white color in the white underbase, otherwise,
c) for each image point, computing the amount of white underbase to be printed by making the white underbase percentage equal to the opacity percentage;
d) for each image point, computing a modified color (R) to be used for printer primaries generation for printing on the white underbase using the opacity data and color value (C) determined in step a), wherein R=((100−opacity)*the color of white+opacity*C)/100; and
e) for each image point, converting the modified color (R) into printer primaries.

7. The method of claim 6, wherein the printing colors/primaries are variable based on the type of printer being used.

8. The method of claim 7, wherein the opacity data is configured to create a white underbase on a colored substrate other than having a black background.

9. A method of generating white underbase information from a given image to enable printing on a colored substrate, wherein the color of the substrate is that of a printing primary other than black, comprising the steps of:
a) determining the color value (C) and opacity value for each image point;
b) for each image point, if the opacity value is zero, assigning a value of zero for the white underbase, otherwise,
c) for each image point, computing a modified color (R) to be configured for color/primaries generation using the opacity data and the color value (C) determined in step a), wherein R=(opacity*C)/100;
d) for each image point, splitting the modified color (R) into printing primary percentages that includes a percentage of a printing primary that is the same as the substrate color;
e) for each image point, generating a white underbase, wherein the percentage of white underbase is based on 100 minus the percentage of the printing primary color extracted in step d) that matches the color of the substrate; and
f) for each image point, assigning 0% to the printing primary that matches the color of the substrate.

10. The method of claim 9, wherein, the printing colors/primaries are variable based on the type of printer being used and includes as a printing primary the color corresponding to the substrate color as one of the printing colors/primaries.

11. The method of claim 10, wherein the color printing primary data is configured to create a white underbase on a substrate having a colored background.

* * * * *

UNITED STATES PATENT AND TRADEMARK OFFICE
CERTIFICATE OF CORRECTION

| | | |
|---|---|---|
| PATENT NO. | : 9,036,227 B2 | Page 1 of 1 |
| APPLICATION NO. | : 11/919305 | |
| DATED | : May 19, 2015 | |
| INVENTOR(S) | : Sanjay Chandermohan Maheshwari | |

It is certified that error appears in the above-identified patent and that said Letters Patent is hereby corrected as shown below:

On the title page

Column 1, Item (30) Foreign Application Priority Data, Line 32, insert
-- Feb. 16, 2006   (IN)........................214/MUM/2006 --

In the claims

Column 10, Line 43, Claim 10, delete "wherein," and insert -- wherein --

Signed and Sealed this
Twenty-seventh Day of October, 2015

Michelle K. Lee
*Director of the United States Patent and Trademark Office*